Jan. 4, 1949.  R. D. SANDERS  2,458,305
TUBULAR ARTICLE COMPRISING RUBBER-LIKE MATERIAL
Filed April 26, 1947
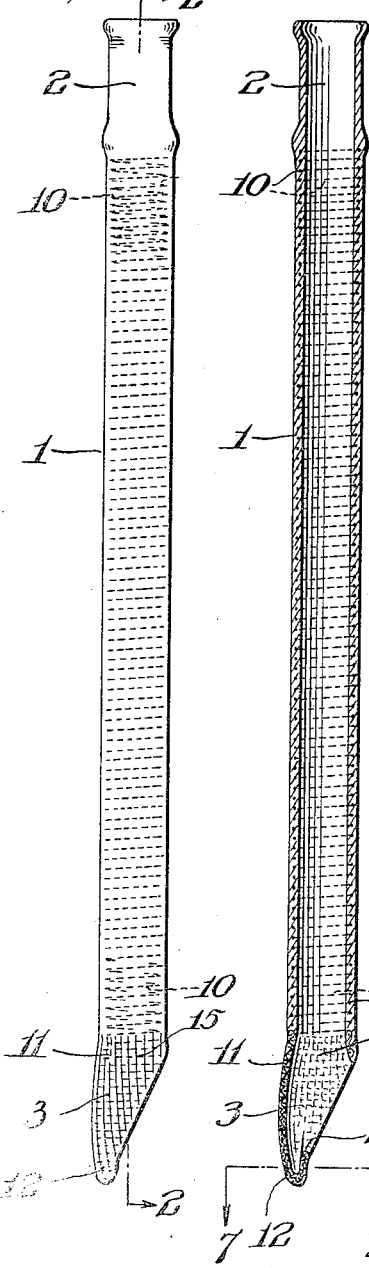
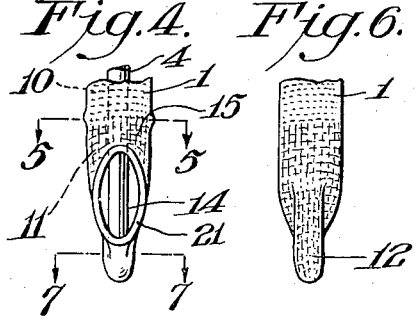
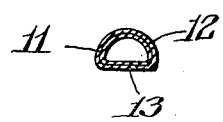
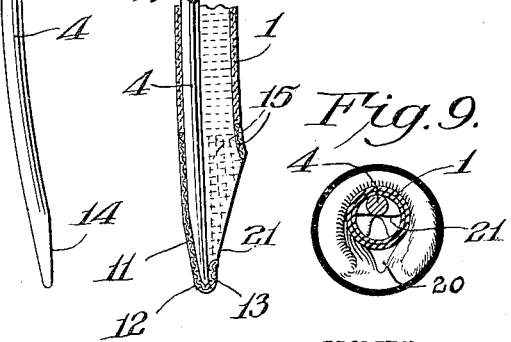
INVENTOR
Richard D. Sanders
BY Walter C. Wheeler
ATTORNEY Patented Jan. 4, 1949

2,458,305

UNITED STATES PATENT OFFICE 2,458,305

TUBULAR ARTICLE COMPRISING RUBBER-LIKE MATERIAL

Richard D. Sanders, Phoenixville, Pa.

Application April 26, 1947, Serial No. 744,056

7 Claims. (Cl. 128—348)

This invention relates to tubular articles comprising rubber-like material and a reinforcing of special construction of a thermoplastic, elastic material, such as Nylon; and further to devices comprising such tubular articles which are combined with specially formed scoop-shaped tips enabling the devices to be useful as respiration tubes in medical practices, such as an endotracheal tube for use in anesthesia, resuscitation or respiration.

Tubular articles composed of rubber and such articles or tubes combining rubber with various reinforcing materials are known, such as rubber tubes reinforced with wires embedded in the rubber or rubber combined in various ways with rubber-impregnated woven textile material. Such tubular structures, however, are not suitable for the main tubular portion of respiration tubes for use in endotracheal anesthesia. In the main tubular portion of such a device is required special characteristics, such as sufficient flexibility, resistance to collapse, ability to bend around a sharp angle without folding, and ability to temporarily deform and re-form in order to attain ends known to be desirable in such medical practices. While tubes for this purpose composed of rubber have some ability to deform and re-form, they have only slight resistance to collapse and they are prone to fold upon bending sharply. The patient may easily be strangled in case of the collapse of an all rubber tube due to an involuntary reaction of the patient. The patient may involuntarily bite a rubber or compounded rubber tube which is not reinforced and cause such a strangulation, or by the same act he may permanently flatten and close a metal wire-reinforced tube. When tubes composed of rubber-like material are constructed with relatively heavy side walls so that they have considerable resistance to collapse and some power to re-form themselves, their resistance to bending is too great because of their relatively thick walls and the size of the lumen or bore is too small for use for the purposes required.

Somewhat less collapsible, but considerably more flexible, tubes than those composed of rubber or compounded rubber have been made by embedding a metallic wire or a textile fabric in the tubular body of rubber or rubber-like material. Such tubes comprising wire or textile fabric provide a certain resilience and resistance to internal forces tending to burst the tubes, but these materials do not combine in rubber-like tubular structures to produce characteristics such as those required in the tubular structures above mentioned. For example, tubular structures made of rubber or rubber compound and fabric tend to fold upon bending sharply, whereas a respiration tube comprising a skeleton of metallic wire embedded in the rubber or rubber compound will remain collapsed and strangle the patient, when completely collapsed as by biting the tube. The collapse of such a tube from any cause renders it useless for its intended purpose. For these and other reasons, it was desirable to provide a combination comprising a tubular structure containing rubber-like material combined so as to have a novel combination of characteristics. The tubular portion of the novel respirator tube is believed to be a novel and patentable article of manufacture, as well as the respirator tube in which it is combined.

It is therefore among the general objects of the present invention to provide tubular articles of manufacture comprising rubber-like material and a skeleton of light in weight, tough, thermoplastic, self-sustaining elastic material, such as Nylon monofilament. Another object of the invention is to provide a tubular article which is relatively highly resistant to collapse and which forcibly and promptly returns to its original shape after it is collapsed. A further object of the present invention is to provide such a tube which can be bent sharply without folding. Another object of the invention is to provide a respirator tube comprising a tough, strong elastic, pliable highly non-collapsible tubular portion and a formed terminal yielding, deformable portion or tip adapting the combination for use as a respirator tube. Still further objects of the invention will be apparent from the following description which is made with reference to the drawings in which Fig. 1 is a side elevational view of a respiration device showing a tubular cylindrical body having an embedded spiral skeleton in the cylindrical body and a fabric of plain weave embedded and arranged in the tip.

Fig. 2 is a cross sectional view of the tube taken along the line 2—2 of Fig. 1, Fig. 3 is a side elevational view of an introducer or applicator which may constitute a part of the device and is useful for placing the respirator tube in operative position, Fig. 4 is a front elevational view of the tip portion of the tube shown in Fig. 1, showing the applicator bar in position for inserting the tube in place, Fig. 5 is a cross sectional view of the tube taken along the line 5—5 of Fig. 4, showing the normal position of the applicator or introducer in the tube and the opening in the tip of the tube as viewed from the end opposite the tip, Fig. 6 is an elevational view of the back side of the tip shown in Fig. 4, illustrating the outer contour of the extreme portion of the tip, Fig. 7 is a cross sectional view of the extreme portion of the tip taken along the line 7—7 of Fig. 2, Fig. 8 is a side elevational view of a portion of the tip, illustrating the normal operative assembly of the tube and applicator, and Fig. 9 is a plan view showing the larynx as it appears with the respiration tube in place and before the introducer is removed, the tube and introducer being shown in cross section.

Referring to Fig. 1, the device comprises a tubular body portion 1 of novel reinforced construction which comprises a rubber-like material such as natural rubber or a yieldable vulcanized rubber composition, and which in and of itself is a novel tubular article of manufacture. A nipple portion 2 or connector at one end of the tubular body may be composed entirely of the unreinforced yieldable rubber-like material for easily making connections to gas supply pipes or other tubular apparatus. A tapering somewhat scoop-shaped tip 3 at the other end of the body is of novel construction and is formed for facilitating the introduction of the device in operating position, for facilitating desired observations and for attaining the desired operative features, strength and safety factors when installed. The tip 3 is relatively thin, pliant and wedge-like or tapering from the relatively small outer end to the circular area of attachment to the body portion 1, and comprises a structure of threads and rubber-like material which permits elongation of the tip and twisting of the tip into a relatively small cord, with relative ease. This action in the tip is atained by an elongated applicator or introducer of novel construction which is formed to cooperate as well with other of the novel features of the combination.

The novel tubular body portion 1 upon which the end portions 2 and 3 are mounted, has a reinforcing tubular skeleton embedded in the tubular wall of rubber-like material. The embedded skeleton is formed with at least one member or cord extending from end to end of the tubular body portion so that complete severing of the tube will be avoided in case the rubber-like material of the wall is completely severed. This cord may consist of one continuous strand or of several strands connected together. Preferably this skeleton is a coil formed into a tubular skeleton of circular cross section but tubes and skeletons having other cross sections of closed configuration, such as elliptical or of unconventional cross section, can be made. A continuous cord composed of a monofilament 10 forming the entire tubular skeleton is desirable. In case of an accidental severing of the rubber-like material intermediate the ends of the main tubular body during use, such as an endotracheal tube, the severed portion may be readily recovered since the spiral provides a cord of high tensile strength which is resistant to cutting or breaking. The severed portion of the tube can be drawn out of the throat by means of the monofilament without the use of instruments.

Instead of a spiral, the skeleton can be formed of rings of monofilament fastened together with a cord or monofilament throughout the length of the tubular portion. Any other form of skeleton which connects both ends of the tube through the tube wall and forms a tubular skeleton is effective but a spiral skeleton is preferable since it permits of a high degree of endwise flexibility and ability to bend around corners without collapsing while retaining a high bursting strength in the tube portion and ability to rapidly re-form.

The monofilament from which the skeleton is formed must have the property of setting after having been formed by heating, and of retaining the heat-set shape when it is cooled, of being relatively stiff but pliable when cold, of being somewhat elastic but strong, of forcibly and promptly re-forming upon being distorted from its pre-formed shape, and of being highly resistant to corrosion from the constituents of vulcanized rubber compositions or non-corrosive. Thermoplastic materials have been found to have the requisite properties, and I prefer spiral Nylon monofilament for this purpose since it can be formed and re-formed with heating and it has the strength and elasticity characteristics which, when embedded in the rubber-like material, gives the tubular body a desirable novel combination of properties.

The term Nylon in the present specification and claims refers to a synthetic linear polyamide which is solid and thermoplastic, of the kind described in U. S. Patents Nos. 2,071,250, 2,071,253 and 2,130,948 which may be obtained by condensation polymerization of bifunctional molecules containing complementary amide forming groups. Such solid thermoplastic products obtained by condensation polymerization of hexamethylene diamine and adipic acid are typical.

Having provided the skeleton, the tube wall is completed by molding or otherwise forming the rubber-like material in the form of a tube and embedding the monofilament in the wall material. This structure provides a continuous tubular article which is flexible, pliable, capable of being bent sharply, and having higher tensile and bursting strength than a similar tube composed of similar rubber-like material, but being somewhat yieldable and extensible in all directions. The tube thus constructed, such as a tube having an embedded spiraled Nylon monofilament is resistant to collapse, from external or internal forces, but is capable of readily re-forming. It promptly and forcibly returns to its heat-set shape after having been collapsed and the combination gives the unique characteristic of being able to bend sharply transversely to the axis without folding or constricting the tube. When formed of an elongated mono- or multi-filament, the latter of which may be parallel, twisted or woven, the cross sectional shape of the tube may be re-formed and re-set upon heating and forming so that it may be adapted for special uses in the field.

In the structure of the respirator tube shown in the drawings, the nipple or end member 2 may desirably be composed of rubber having a pliable wall of convenient thickness for stretching the nipple portion over the end of a gas supply tube or to form a connection with a respirator device, but any construction suitable as a connector is sufficient.

The somewhat pointed scoop-shaped end member 3 at the other end of the respirator is pliable, yielding, elastic, and deformable into an elongated wedge shape or a twisted wedge shape. It terminates in a nose-like member comprising rubber-like material. The wall of the scoop-shaped tip is reinforced by a network of crossed strands or woven fabric of open mesh. These crossed or interwoven threads may be composed of any suitable material or size, provided the pliant characteristic of the wall of the tip is not destroyed by heating. The threads may be woven into an open fabric in any style of weaving, such as a plain open weave shown in the drawings, which will form a network that provides resistance to tearing and which permits tying-in of the longitudinally extending filamentary threads with the skeleton of the main tubular portion 1. This provides a tip portion which is not likely to become detached or torn from the tube in case of accidental separation of the rubber-like material. The tied-in ends of the woven threads provide means for recovering an accidentally severed tip without the use of instruments. The tip is pliant in its walls which extend from the area or line of attachment onto the spirally reinforced tubular body 1 to the line of attachment onto the tip or nose-like end member 12.

The tip is a dilating wedging member which is small at its terminus, and whether it is deformed or not, it gradually increases in size and shape to the size and shape of the tubular body 1. When not deformed, the tip is a wedge shape in which the base has the cross section of the end of tube 1 and is formed by a plane cutting across the tip obliquely to the axis from one side toward the terminus. At the very end, however, is a small nose-like rounded outside form and having a pocket or receptacle inside. When deformed as by elongation or twisting, the intermediate portion of the tip may be made to form a dilating tapering body of less pitch near the terminus than when it is not twisted. The nose member 12 is a small hollow capsule having a tough thickened end wall of rubber-like material or hollow bead-like tip which operates as a small rounded end member for entering the instrument between closely positioned parts such as closely disposed vocal cords. For a short distance from the terminus, the nose 12 or tip member is tubular. For example, for a nose portion of about one-eighth inch outside diameter the tubular part is desirably about one-eighth to three-sixteenths of an inch long. The tubular part of the nose 12 may be cylindrical but preferably it is somewhat tapering, gradually increasing in outside diameter away from the nose. The end of the nose 12 preferably has thickened walls which resist puncturing when the applicator or introducer 4 is forcibly applied to stretch the pliant walls, but in the tubular part of the nose, the walls are preferably thinner and more pliant. The longitudinal surface elements of one side of the tubular portion of the nose 12 opposite the elements cut by the oblique plane are approximately coextensive with the corresponding longitudinal surface elements of the main body 1 of the tube. The nose is thus located to one side of the axis of the tube.

The inside of the wall of the hollow beaded tip 12 preferably has at least one flat side 13 which is engaged by the corresponding flat side 14 of the tip of the applicator or introducer 4, whereby the tip can be twisted from side to side or into a spiral.

The pliant walls 3 and the nose member 12 form a generally rounded wedge shaped end, the pliant side walls presenting an external rounded surface which is cut off by a plane which obliquely intersects the axis of the tubular portion 1 beyond its end. The wedge shaped tip thus presents a rounded wedge or pliant membrane which gradually expands from the walls of the curved surfaced rod-like nose member as it approaches the walls of the tubular member 1. However, between the reinforced walls of the tubular member 1 and the wedge forming pliant walls, a short pliant tubular section 15 reinforced with pliant threads is desirably built in. This constitutes a connective portion gradually approaching the walls of the wedge shaped portion in size, shape and pliability. The pliant portions combined as described arranged themselves into a slim rounded wedge extending from the reinforced tubular portion 1 and approaching the diameter and shape of the nose member 12 as the pliant walls are elongated axially by forcing the applicator outwardly and thus elongating the entire tubular structure. In this elongated tensed position, the applicator or introducer can be turned or twisted by reason of the engagement of its flattened side with the inner flattened surface of the nose, thereby to manipulate the tip in a sidewise or curved path to aid in disposing it in exactly the desired position in front of the opening into which the tip is about to be entered. When the tip is manipulated into the correct position, the tube is advanced, whilst it is still elongated. After being inserted into the opening beyond the point where the spirally reinforced walls begin, the applicator may be released and removed, leaving the device constituting a conduit extending through the larynx.

The applicator or introducer 4 is a relatively small stiff rod of self-supporting material such as steel, but preferably of a corrosion resistant plastic, such as Celluloid, cellulose acetate, Nylon, or the like which is formed at one end to fit into the nose member 12. The introducer 4 is preferably rounded at the end so that it will not cut the rubber-like material of the nose when the nose and pliant walls are forced outwardly. Where the applicator engages the tubular portion of the nose, it is suitably shaped to conform to the opening in the nose so that the nose can be readily rotated back and forth in response to the turning of the applicator. At least one side of the applicator is thus flattened. Where the tubular part of the nose is D-shaped inside, the applicator 4 is preferably given a D-shaped cross section, as shown in Fig. 7. The applicator may be straight but it is preferably bent slightly to one side, as shown in Fig. 3, so that when the applicator is turned, the end will describe a curved path. The applicator should be long enough to extend beyond the nipple 2 to provide a handle for manipulating the tip.

The obliquely disposed plane of separation in the pliant tip permits disposing the entering nose portion 12 to one side of the axis and in line with the tube wall on one side. The introducer 4 is preferably somewhat smaller in diameter than the tubular portion 1 so that when the axis of the respirator is rectilinear or approximately rectilinear, the opening, or a part of the opening into which the nose 12 is to be entered can be viewed, when the nipple is elongated and the tube is straight, through the tube from the end of the nipple 2, displaying the view of a larynx and vocal cords which is illustrated by Fig. 9, the numeral 20 designating the opening between the vocal cords. The view through the tube is thus obtained through the opening at the obliquely cut end which is defined by the margin 21, the same being in a plane which is oblique to and cuts the axis of the tube. When the introducer is removed and the respiration tube is in final operative position, the off-set tip affords an unobstructed passage for introducing an aspirator to remove mucus or blood without interfering with breathing.

The tipped combination is especially useful in medical practice as an endotracheal tube for administering anesthetics or for resuscitation. It may also be used in general as a catheter or as an instrument to aid direct views of internal portions through incisions. Devices of various sizes and proportions can be made for various uses. In an endotracheal tube of about 12 millimeters outside diameter suitable for most uses on adults, rounded Nylon monofilament of about 20-thousandths inch diameter coiled and embedded in a wall of rubber-like material, such as vulcanized rubber, of about 1 to 1.25 millimeters thick is a desirable proportion and size.

The devices herein described may be made in general by processes which are known to manufacturers of rubber-like articles. Molding or dipping processes may be used. For example, a desirable method of manufacturing an endotracheal respiration tube by a dipping method comprises providing a stainless steel mandrel formed on the outside like the inside of the endotracheal tube and having a connector in that part which corresponds to the opening bounded by the margin 21 of the tube so that the mandrel can be dipped into the solution of rubber composition endwise with the wedge shaped tip uppermost. Upon repeatedly dipping the mandrel into the rubber solution with the wedge shaped tip uppermost and allowing the solvent to evaporate between each dipping, an inner wall of rubber-like material is formed, the upper or tip portion being thinner than the rest. Then the spiral, such as a Nylon spiral is wound on the tubular part 1 and the mesh, such as a single layer of surgeon's gauze is formed on the tip, tying the ends of the longitudinally extending threads to the Nylon spiral. Upon continuing the dipping of the form into the rubber solution a thin wall at the tip and a thicker wall in the tubular portion is formed. The tip 2 of the tube is formed at the same time by omitting to dispose the Nylon spiral on this part of the mandrel. Finally the shapes at the margin of tip 2 and the opening and margin 21 in the tip 3 can be formed by suitably trimming and molding after the dipping operation is completed. A suitable solution for such a dipping operation may comprise about 60% of pre-vulcanized rubber composition or mix dissolved in a suitable volatile solvent comprising weak aqueous ammonia of suitable concentration. Upon exposing the dipped or mandrel formed coating to the atmosphere, the solvent evaporates leaving a thin outside layer of the rubber composition. The dipping is repeated until a coating of desired thickness is produced.

A skeleton of thermoplastic material is desirable. The cross section of the filament may be varied but from considerations of cost and general desirable properties, a monofilament of rounded outside contour is satisfactory. Various other modifications can be made in carrying out my invention and it is to be understood that the invention is not limited to the modifications thereof which are specifically pointed out or described, or that the claims may be construed with limitations which are not expressed.

I claim:

1. A device of the kind described comprising a tubular portion and a tapering scoop-shaped tip attached to one end of the tubular portion, said tip narrowing toward its terminus to an extended externally rounded nose member having a terminal pocket therein; the side walls of said scoop-shaped tip being relatively thin, pliant, normally self-sustaining but collapsible and having embedded therein an openly arranged pattern of overlapping strands, at least one of which extends lengthwise of the tip; said tip having an opening into the tubular portion through a bore which is co-extensive with the bore of the tube and a lateral opening whose margin lays in an oblique plane which cuts across the axis of the tubular portion, thereby providing an aperture directed downwardly and away from the tubular portion; said tubular portion comprising a skeleton formed of a strand of thermoplastic material embedded in rubber-like material, and being somewhat flexible, relatively difficultly collapsible, relatively rapidly and forcibly re-formable, capable of readily bending around corners without collapsing and having higher tensile and bursting strength than a wall of like proportions composed of the rubber-like material, at least one of said skeleton members connecting with both ends of said tube through the wall; at least one of the longitudinally extending strands in said tip being joined with the skeleton of said tubular portion.

2. A device in accordance with claim 1 in which the skeleton of the tubular portion comprises strands of Nylon.

3. A device in accordance with claim 1 in which the overlapping strands in the tip are fine threads arranged in an open weave.

4. A device in accordance with claim 1 in which the skeleton of the tubular portion comprises a spiral of Nylon filament and the strands in the tip are fine threads arranged in an open weave.

5. A device in accordance with claim 1 in which the skeleton of the tubular portion is a spiral of Nylon monofilament and the strands in the tip are fine threads arranged in an open weave.

6. The combination which comprises a device in accordance with claim 1 and an elongated rod-like introducer having one end shaped to conform to the pocket in the nose of the tip member, said introducer being of less diameter than the bore of the tube portion so as to afford a free view through the tube at the side of said introducer, said introducer being elongated to protrude beyond the other end of the tube from said tip for manipulating said tip.

7. The combination which comprises a device in accordance with claim 1 and an elongated rod-like introducer having one end shaped to conform to the pocket in the nose of the tip member, said introducer being of less diameter than the bore of the tube portion so as to afford a free view through the tube at the side of said introducer, said introducer being elongated to protrude beyond the other end of the tube from said tip for manipulating said tip, said introducer being bent intermediate its ends so that rotation about the axis of its protruding portion will cause the tip to describe a curved path.

RICHARD D. SANDERS.

REFERENCES CITED

The following references are of record in the file of this patent:

UNITED STATES PATENTS

| Number | Name | Date |
|---|---|---|
| 539,224 | Huss | May 14, 1895 |
| 2,273,200 | Hoff | Feb. 17, 1942 |
| 2,349,290 | Loughborough | May 23, 1944 |